(12) United States Patent
Justus

(10) Patent No.: US 6,318,244 B1
(45) Date of Patent: Nov. 20, 2001

(54) DEVICE FOR ENCASING FLAVORING SOLIDS

(75) Inventor: Christian Justus, Hamburg (DE)

(73) Assignee: Riensch & Held GmbH & Co., Hamburg (DE)

(*) Notice: Subject to any disclaimer, the term of this patent is extended or adjusted under 35 U.S.C. 154(b) by 0 days.

(21) Appl. No.: 09/507,077

(22) Filed: Feb. 18, 2000

(30) Foreign Application Priority Data

Feb. 19, 1999 (DE) .......................................... 299 02 992 U

(51) Int. Cl.[7] .................................................. A47J 31/06
(52) U.S. Cl. .................................. 99/323; 99/318; 99/299; 99/289 R; 99/279
(58) Field of Search ............................. 99/323, 322, 318, 99/298, 299, 289 R, 295, 323.3, 279; 210/348, 350, 359

(56) References Cited

U.S. PATENT DOCUMENTS

| | | | |
|---|---|---|---|
| 2,569,820 | * 10/1951 | Locke | 99/289 R |
| 5,461,968 | 10/1995 | Portman | 99/287 |
| 5,680,809 | * 10/1997 | Dings et al. | 99/289 R X |
| 5,924,354 | * 7/1999 | Court et al. | 99/318 |

FOREIGN PATENT DOCUMENTS

| | | |
|---|---|---|
| 569 372 | 2/1933 | (DE) . |
| 34 38 539 | 4/1986 | (DE) . |
| 41 24 993 | 7/1992 | (DE) . |
| 692 01 237 | 8/1992 | (DE) . |
| 196 37 899 | 1/1998 | (DE) . |
| 2 249 021 | 4/1992 | (GB) . |

* cited by examiner

Primary Examiner—Reginald L. Alexander
(74) Attorney, Agent, or Firm—Altera Law Group LLC

(57) ABSTRACT

Proposed is a device for encasing flavoring solids (T), in particular tea material or coffee, that are put into a liquid, in particular water, with a vane (20') movable between an initial and a final position, which vane in its final position bounds a space (8") that holds the flavoring solids (T), the vane being designed as a rotatable vane (20') that is supported so as to be rotatable around a rotational axis.

17 Claims, 4 Drawing Sheets

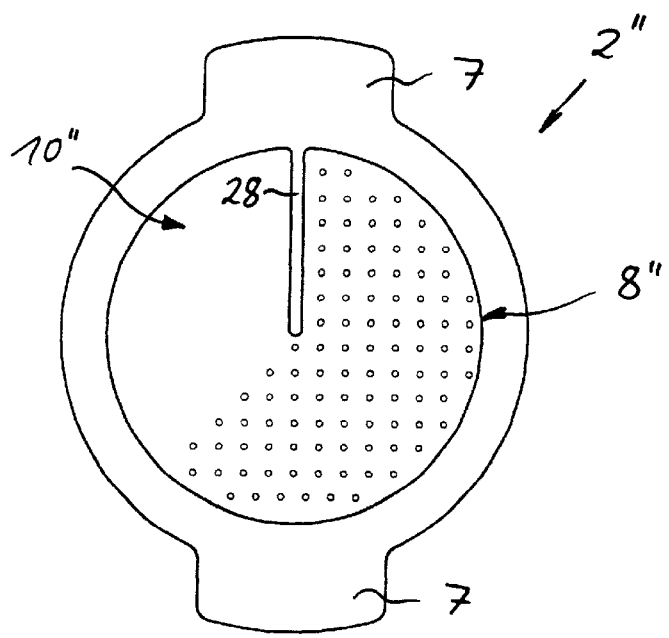
Fig. 3a
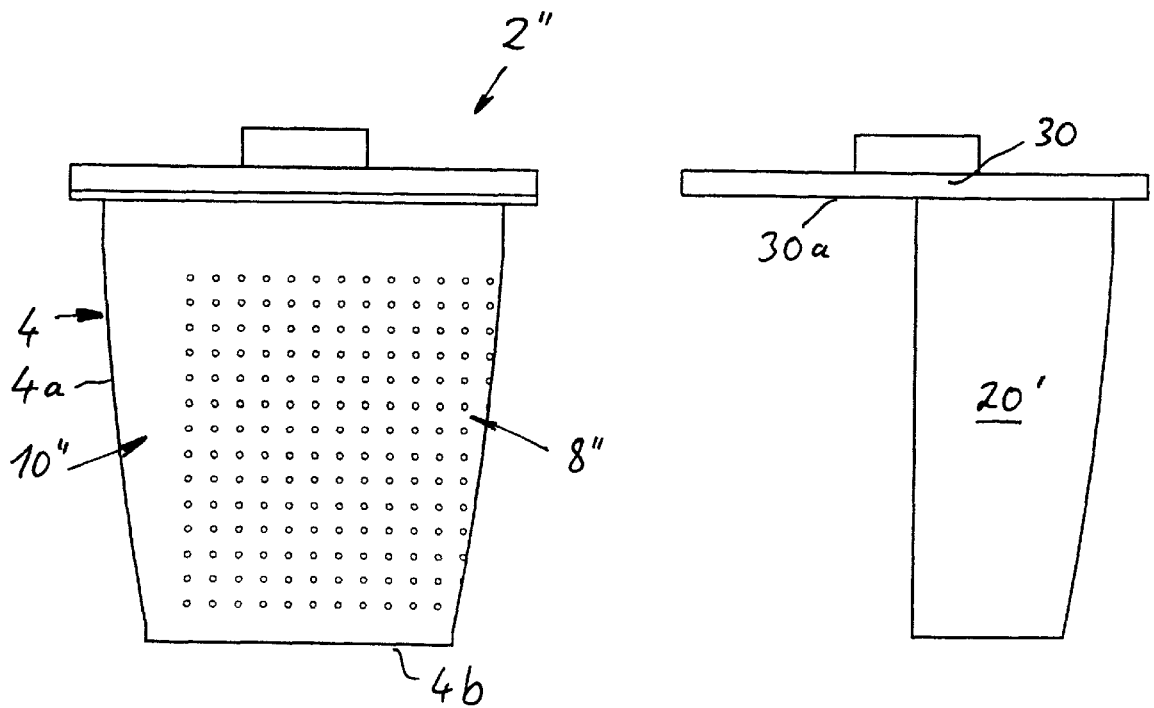
Fig. 3b
Fig. 5

DEVICE FOR ENCASING FLAVORING SOLIDS

The invention concerns a device for encasing flavoring solids, in particular tea material or coffee, that are put into a liquid, in particular water.

FIELD OF THE INVENTION

Up to now, such device s were designed in particular as filter elements and as a rule were reusable. With known filter elements of this type there exists, however, the disadvantage that the filter element must be removed from the container after the steeping time has elapsed. That is, if the steeping time is exceeded, then the taste of the drink can be adversely affected through an excessive release of flavoring substances, for example so-called bitter constituents, from the filter sludge, for example tea material, located in the filter element. The preparation of the drink can thus be properly completed only through the removal of the filter element from the container.

DESCRIPTION OF RELATED ART

The ease of use of a reusable filter element of the type specified at the beginning would increase if it could remain in the container after the steeping time has elapsed. Therefore, the task forming the basis of the invention is to improve a filter element of the type named at the beginning in such a manner that the contact of the filter sludge located within the filter casing with the liquid in the container can be intentionally ended through the intervention of the user, without necessitating the removal of the filter insert.

According to the invention, this task is accomplished by the fact that provision is made for a slide that is situated so as to be movable between an initial and a final position, which slide in its final position bounds a space that holds the flavoring solids and is designed as a rotatable vane that is mounted so as to turn around a rotational axis.

SUMMARY OF THE INVENTION

The device according to the invention permits an intentional ending of the steeping process of the flavoring solids through the intervention of the user, by his or her rotating of the rotatable vane from its initial position into its final position. For this, the flavoring solids, for example tea material, are first put into the liquid, so that they achieve contact with the liquid and release the corresponding flavoring substance into the latter. In this, the rotatable vane is arranged in its initial position. After the elapsing of the steeping time, according to the invention the rotatable vane is turned, whereby it is brought from its initial position into its final position and in the process takes up the flavoring solids into a space that is bound by the rotatable vane in its final position. When, through the turning of the rotatable vane, the flavoring solids have been completely taken up in that space, there no longer exists any contact with surrounding liquid, whereby the steeping process of the flavoring solids in the liquid is intentionally ended. Since the rotatable vane in its final position now bounds the space that takes up the flavoring solids, the flavoring substances are prevented from leaving that space again in an undesired manner and coming into contact again with the liquid surround that space. Therefore, the flavoring solids need not be removed from the liquid immediately upon the completion of the steeping process.

The advantage of the device according to the invention consists, first of all, in the fact that the user can intentionally end the steeping process without needing to immediately remove the flavoring solids from the liquid, whereby the ease of use is clearly increased. The rotatable mounting of the slide, in accordance with the invention, permits here a simple and reliable operation, whereby in particular the development of an undesired tipping moment is prevented, which in conventional coffee presses with vertically movable slides could lead to a tipping over and thus to a damaging of the barrel that takes up the liquid. Beyond that, by means of the construction according to the invention, in contrast with conventional filter elements, even with low filling levels the full filtering function of the device is maintained without perforations in the lower section and/or bottom region. Finally, the invention leads to a simple construction, which positively affects the production costs; for example, the entire device with all of its stationary and moving parts can be made of plastic.

Advantageously, provision is made for a housing.

In a preferred implementation, the device is designed for use in a container, in particular a teapot, which displays a housing, specifically a housing formed as a rotating body; in this case of the housing the device is formed by the housing of the container. This results in an especially simple and thus cost-effective structure. Since in operation the rotatable vane is immersed into the liquid, the rotatable vane should advantageously display a liquid-permeable section, which ensures that the displacement of the liquid does not hinder the rotatable vane in its turning movement. Preferably, therefore, the liquid-permeable section should be designed on the upper section of the rotatable vane and/or should be perforated.

A further implementation that is preferred at present is designed as a filter element for containers, in particular teapots, with a filter housing, formed in particular as a rotating body, for taking up the flavoring solids, which housing displays a liquid-permeable first section and a liquid-impermeable second section, which forms the space that takes up the flavoring solids and is bound by the rotatable vane in its final position; the rotatable vane in its movement from the initial into the final position brings the flavoring solids into the second section, and the first section and the second section are arranged next to each other essentially in the direction of rotation of the slide.

This implementation allows an intentional ending of the steeping process of the flavoring solids in the container through the intervention of the user, without requiring that the filter element be removed. This happens by virtue of the fact that the flavoring solids are first filled into the filter housing and make contact there with the liquid in the container, releasing the corresponding flavoring substances into it, and after the elapsing of the steeping time the rotatable vane is turned and thereby brings the filter sludge, now consisting of the flavoring solids, into the liquid-impermeable second section. When the filter sludge, through rotation of the rotatable vane, has been brought completely into the liquid-impermeable second section, there no longer exists any contact with the surrounding liquid, whereby the steeping process is intentionally ended. In this, the rotatable vane is turned into a position such that it separates the filter sludge, now located in the liquid-impermeable second section of the filter housing, from the remaining part of the filter housing, and in particular from the liquid-permeable first section. Thus, in this position the rotatable vane bounds a space formed by the liquid-impermeable second section of the filter housing, whereby the filter sludge is prevented from again leaving the liquid-impermeable second section of the filter housing in an undesired manner and from again coming into contact with the liquid surrounding the second section. Since the filter sludge in the liquid-impermeable second section is separated from the "surroundings" and thus no further contact with the surrounding liquid exists, the filter element can remain in the container and in the liquid without any further influencing of the surrounding liquid by the filter sludge. Accordingly, the filter element according to the invention need not be removed from the container and thus from the liquid even after the completion of the steeping process.

Advantageously, the first section of the filter housing displays at least one wall that is at least partially perforated, and/or at least one open region that is covered with a mesh screen.

Finally, a part of the bottom belonging to the liquid-permeable first section can likewise be liquid-permeable. Such a half-open bottom permits an especially simple cleansing of the interior of the filter housing, since in particular a thorough rinsing thereby becomes possible.

Beyond that, the rotatable vane should be situated so that at least a portion of its edge essentially forms a sliding seal on at least one portion of the walls of the housing.

An implementation form of the invention preferred at present is characterized by the fact that the rotatable vane extends over the entire breadth of the housing and therefore is formed as a double wing, the rotational axis running through the central section of the rotatable vane, which central section connects the two wings to each other. Preferably, in this implementation the rotatable vane extends axially over the entire diameter of the housing and is situated with its edges forming an essentially sealing arrangement on the walls of the housing, in order to achieve, to the greatest extent possible, a liquid-impermeable seal. In this implementation the housing is preferably divided into two equally large sections, which in each case extend over an angle of 180°; the one section concerns the liquid-permeable first section and the other the liquid-impermeable second section. Prior to the preparation [of the drink] the rotatable vane is adjusted in such a manner that a liquid-permeable region of maximal size is formed in the first section. In this, the rotatable vane is brought into a position in which it divides the first section from the second section. The flavoring solids are then filled into the liquid-permeable first section and subsequently brewed. After the steeping time has elapsed, the rotatable vane is turned 180°, whereby the flavoring solids are transported out of the liquid-permeable first section and into the adjacent liquid-impermeable second section, where the contact with the surrounding liquid is then interrupted and flavoring substances can no longer be released into the liquid.

As an alternative, the rotatable vane can also be formed as a wing extending radially from the rotational axis to the wall of the housing and the second section can be formed by a stationary element that, in particular, projects from the wall of the housing in addition to the rotatable vane situated at the end location of this element. Thus, in this alternative implementation provision is additionally made for a stationary element that preferably runs essentially or nearly from the central axis of the filter housing radially to the housing wall, while the rotatable vane is formed as a movable element that likewise preferably extends from the central axis to the housing wall. In this alternative implementation a chamber is formed between the stationary element and the rotatable vane, which chamber, depending on the position of the rotatable vane, forms either the liquid-permeable first section or the liquid-impermeable second section. Through a rotational movement of the rotatable vane the flavoring solids can be brought from the liquid-permeable first section into the liquid-impermeable second section; in this, the minimum angle of the rotational movement is a function of the size and in particular the angular extent of the section. On the other hand, the maximum angle of rotational movement of the vane is determined by the volume of the flavoring solids or rather the filter sludge, i.e. the rotatable vane can be rotated up to the point at which the filter sludge in the liquid-impermeable second section is essentially pressed together.

In a further preferred implementation the rotatable vane is provided with a handle, in particular formed as a tongue, on that section that adjoins the liquid surface when the rotatable vane is immersed in a liquid or projects from this, in order to permit a simple manual operability.

For this case in which a cover is used for closing an opening designed in particular on the upper side of the housing, the handle can advantageously be fastened directly, in particular as a single piece, to the rotatable vane and the cover can display a perforation through which the grip projects when the cover is placed upon the housing. In this way, on the one hand the housing can remain closed and on the other hand a reliable operation of the rotatable vane by means of the handle can be ensured.

Alternatively, a stem can be attached to the rotatable vane, which stem is led through a hole in the cover and on whose projecting free end the handle is situated.

In a further alternative, the cover can be placed upon the housing in such a manner that it is supported by the housing in a rotatable fashion, and the rotatable vane can be attached rotationally fixed to the side of the cover facing the housing. Resulting thereby is an especially reliable rotational seating of the rotatable vane.

In the last-mentioned implementation, the cover can form the only support for the rotatable vane, so that the rotatable vane hangs on the cover and is rotatable only by means of the cover. Thus, in this implementation, the rotatable vane is attached to the cover so as to be stationary relative to this and can form an integrated component of the cover. Through rotation of the cover placed upon the housing relative to the housing, the flavoring solids are moved from the liquid-permeable first section into the liquid-impermeable second section of the housing. Thus, a rotating of the rotatable vane is effected through a rotational movement of the cover. This implementation permits an especially simple, yet effective, structure of the device according to the invention, since additional support is not needed, which has an advantageous effect on the production costs of the device.

It goes without saying that the rotatable vane can also be exclusively or additionally seated on the housing in a rotatable manner, for example by means of a pointed extension that is formed on the underside of the rotatable vane and engages a corresponding depression in the base of the housing, thus somewhat in the manner of a needle bearing.

For a further increase in the ease of use, provision can be made for a drive arrangement, in particular a time-controllable drive arrangement, for driving the rotatable vane. The user can set the desired steeping time on a timer, and after the elapsing of this time the drive arrangement is automatically activated, whereby the rotatable vane is displaced in a rotational movement sufficient to bring the flavoring solids into the space that is defined in final position of the rotatable vane.

Finally, it should be noted that the rotatable vane should preferably be designed as a plate-like element that is essentially flat.

Further preferred implementations of the invention are specified in the dependent claims.

BRIEF DESCRIPTION OF THE DRAWINGS

In the following, preferred implementation examples of the invention are explained in greater detail with the aid of the accompanying drawings. They show:

FIG. 3: a third implementation, modified with respect to the second implementation, in plan view (a) and in side view (b)

FIG. 5: a cover for the filter housing of the second and third implementations

DETAILED DESCRIPTION OF THE INVENTION

Figure 1A:
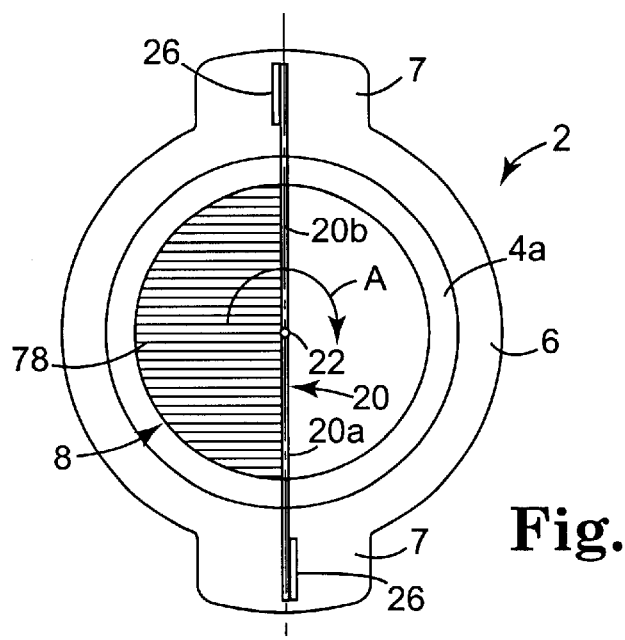
FIG. 1: a first implementation of the device according to the invention in plan view (a) and in side view (b), as well as the bottom of the filter housing (c)
Figure 1B:
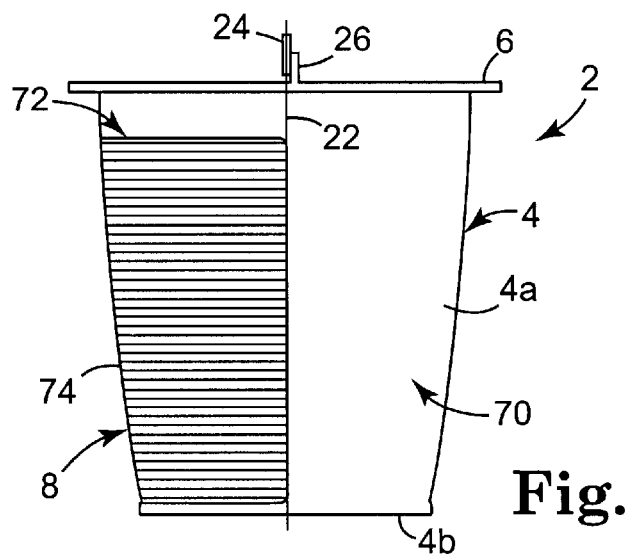

Represented in FIG. 1 is a first implementation 2 of a filter element that displays a filter housing 4. The filter housing has a circular side wall 4a and a bottom 4b, and in the implementation represented here has the form of rotational body that runs in a conical manner towards the bottom 4b, as can be seen from FIG. 1b. On its top side 4c the filter housing 4 is open and displays there a circular flange-like rim 6. The filter element 2 is hung in the container, which is not represented in the figures, by inserting the bottom 4b and side wall 4a of the filter housing 4 through an opening in the container and into the interior of the latter, and resting its circular flange-like rim 4 on an edge section that borders the opening of the container.

Thus, the flange-like rim 6 serves as the support of the filter element 2 in a container.

The container is preferably a matter of a coffee or tea pot. But it is also conceivable to use the filter element in a drink holder such as a cup, for example.

Figure 1C:
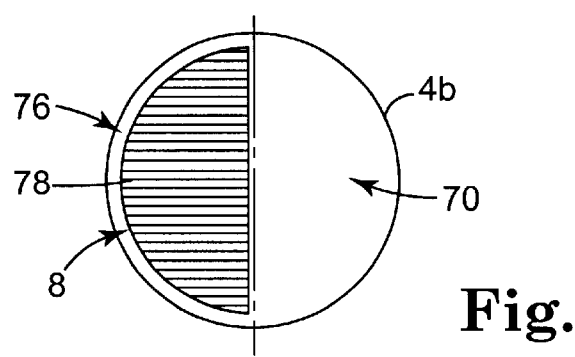

As can be seen in FIGS. 1a and 1c, the filter housing 4 has a circular cross-sectional shape. At two diametrically opposite locations, in each case a projecting tongue 7 is formed on the flange-like rim 6. These tongues 7 serve first of all as handles for the inserting and removing of the filter element 2, but can also take on a support function in the event that the diameter of the opening of the container is a bit larger than the diameter of the flange-like rim 6.

The filter housing 4 is divided into a first section 8 and a second section 10. Each section 8 and 10 forms a so-called 180° sector and thus a half of the filter housing 4, as can be seen in particular in FIGS. 1a and 1c.

The first section 8 is liquid-permeable, for which in the associated half of the side wall 4a of the filter housing 4 an open region 12 is provided, which region in the represented implementation is covered by a mesh screen. In a similar manner, the half associated with the first section 8 of the bottom 4b of the filter housing 4 is provided with an opening area 16, which is covered by a mesh screen 18. Since the liquid-permeable first section 8 forms one half of the filter housing 4, the open region 12 extends in the side wall 4a of the filter housing 4 over an angle of 180°, as does the mesh screen 14, while the open region 16 in the bottom 4b along with the mesh screen 18 has a corresponding half-circle form. With the mesh screen it can be a matter, for example, of a high-grade steel or plastic mesh screen. Instead of the represented mesh screen 14 and 18, provision can also be made for appropriate perforations in the side wall 4a and the bottom 4b of the filter housing 4.

In contrast, the second section 10 is liquid-impermeable, for which the associated part of the side wall 4a and the associated half of the bottom 4b of the filter housing are appropriately closed.

As can be seen in particular from FIG. 1a, in the interior of the filter housing 4 a rotatable vane 20 is situated so as to be rotatable around a rotational axis 22. In the represented implementation, the axis of rotation 22 of the rotatable vane 20 coincides with the symmetrical or middle axis of the filter housing 4. In this implementation the rotatable vane is designed as a so-called double wing, in which the rotational axis 22 runs through the two wings 20a and 20b of the rotatable vane 20, which wings are connected to each other, as can be seen in FIG. 1a.

In the represented implementation the rotatable vane 20 is formed as a flat, plate-shaped element and extends through the interior of the filter housing 4 from its top side 4c to its bottom 4b. Here, the rotatable vane 20 is situated with its edges (not visible in the figures) in tight, sliding contact with the side wall 4 and the bottom 4b of the filter housing 4.

As FIGS. 1a and 1b show, the rotatable vane 20 displays on its top an upper section 24, which projects beyond the top 4c of the filter housing 4 and at the same time overlaps the flange-like rim 6 at both sides. This upper section 24 serves, first, as a handle for the user, and second, works together with corresponding stops 26 designed on the tongues 7, whereby the rotational movement of the rotatable vane 20 is limited, as can be seen in particular in FIG. 1a.

The two sections 8 and 10, the rotatable vane 20, and the stops 26 are arranged in such a manner that in the final position shown in FIG. 1a the rotatable vane 20, which extends over the entire diameter of the filter housing 4, separates the two sections 8 and 10 from each other.

In the following the manner of operation of the filter element according to FIG. 1 is explained.

First of all, the rotatable vane 20 must take up the initial position according to FIG. 1a. Then the material to be processed, which usually is a matter of ground coffee or tea material, is filled into the first section 8, which is bounded on the on the one hand by the side wall 4a of the filter housing and on the other hand by the rotatable vane 20. The filter element 2 so prepared is placed into a suitable container, which is usually a matter of a coffee or tea pot. The container is filled with a liquid, normally water. The liquid is brewed up and the filter element 2 remains in the container. After the specified steeping time has elapsed, the rotatable vane 20 is rotated approximately 180° in the direction of the arrow A in FIG. 1a, until it is again comes to rest against the stops 26—this time, to be sure, on the opposite sides of the latter. In the process, the filter sludge, which normally is a matter of ground coffee that has now been dissolved in the liquid or tea material that has now been dissolved in the liquid, is transported from the liquid-permeable first section 8 into the liquid-impermeable second section 10, whereby the contact of the filter sludge with the surrounding water is interrupted and flavoring substances can now no longer be released into the liquid. In the liquid-impermeable second section 10 the filter sludge is now completely isolated from the surrounding liquid, since this section 10 is bounded on the one hand by the side wall 4a of the filter housing 4 and on the other hand by the rotatable vane 20, in such a way that it is sealed off from the surroundings.

Figure 2A:
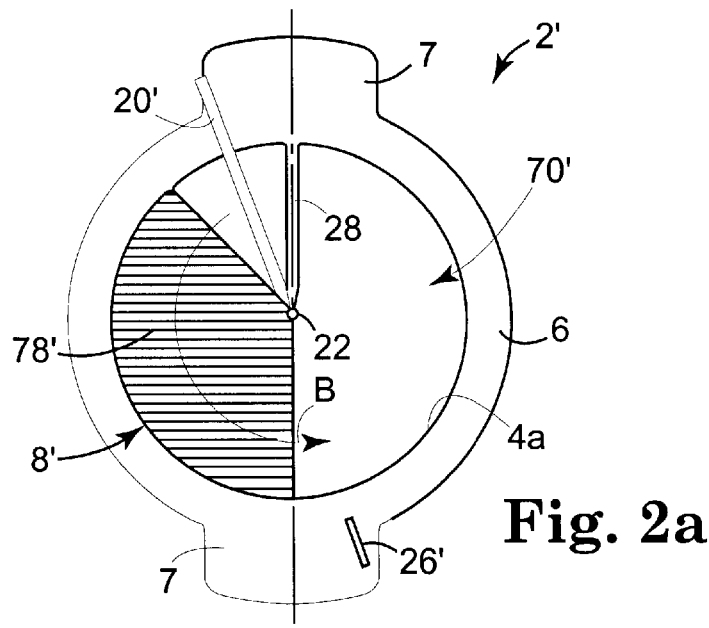
FIG. 2: a second implementation in plan view (a) and in side view (b), as well as the bottom of the filter housing (c)
Figure 2B:
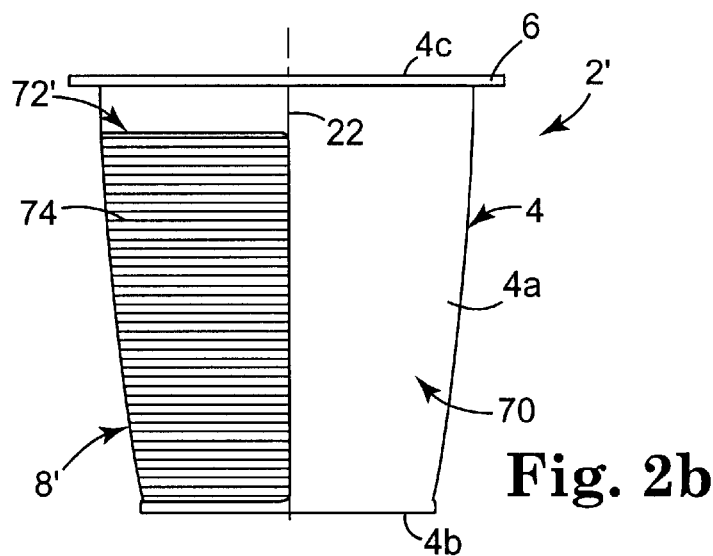
Figure 2C:
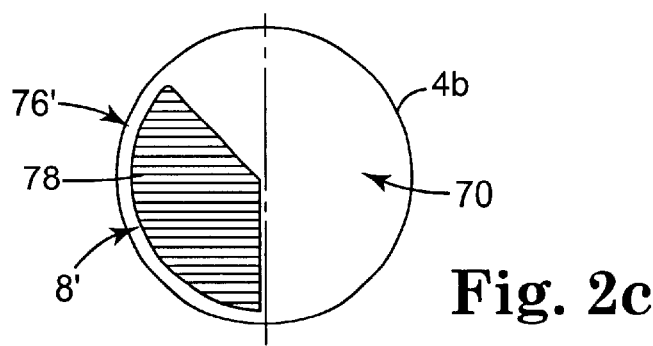

Represented in FIG. 2 is a further implementation 2' of a filter element the is distinguished from the implementation according to FIG. 1 in particular by the fact that the rotatable vane 20' is formed not as a double wing, but rather as a single wing that extends radially from the rotational axis 22 to the side wall 4a of the filter housing 4, and that in addition provision is made for a stationary partition element 28 that is formed onto the inner face of the side wall 4a and the bottom 4b and extends radially to the rotational axis. Both the rotatable vane 20' and the stationary partition element 28 are in each case designed as plate-shaped elements. Furthermore, as a comparison of FIG. 2 with FIG. 1 shows, the liquid-permeable first section 8' is, in the represented second implementation example 2', designed not as a 180° sector, but rather as a 135° sector. The open region 12' accordingly extends over an angle of 135° along the side wall 4a of the filter housing 4 in the latter's circumferential direction. The open region 16' in the bottom 4b of the filter housing 4 is correspondingly formed, as FIG. 2c shows. Finally, in contrast to the first implementation, provision is made for only a single stop 26' on one tongue 7, this stop being off-center in relation to the tongue 7, as can be seen from FIG. 2a.

All of the remaining elements correspond to those of the first implementation, so that a further explanation of these matching elements is dispensed with here in order to avoid repetition.

Shown in FIG. 2a is a rotatable vane 20' in its initial position. A further rotation towards the stationary partition element 28 is not possible, since the rotatable vane 20' is already situated with its section that adjoins the rotational axis 22 butting against the corresponding section of the stationary partition element 28.

In the case of this second implementation, the material to be processed is put into the interior of the filter housing 4, mainly in the region of the first section 8', when the rotatable vane 20' takes up the position shown in FIG. 2a. Since in this position the rotatable vane 20' does not separate the two sections 8' and 10, thus no continuous separating wall exists, the material to be processed can obviously also be distributed into the liquid-impermeable second section 10, which does not, however, affect the functioning of the filter element 2' in any way.

After the steeping time has elapsed, the rotatable vane 20' is rotated out of it initial position shown in FIG. 2a in the direction of the arrow B and in the process takes along the filter sludge located in the first section 8'. The rotating movement of the rotatable vane 20' can continue until it butts up against the stop 26', whereby the entirety of the filter sludge is brought into the liquid-impermeable second section 10.

Obviously, it is also conceivable to place the stop 26' at another location, so that the space inside the second section 10 that hems in the filter sludge can be also be smaller.

Represented in FIG. 3 is an implementation 2" of a filter element that is slightly modified with respect to the second implementation 2' according to FIG. 2, and distinguished from the implementation according to FIG. 2 by the fact that the liquid-permeable first section 8" is not designed as a 135° sector, but rather extends over an angle of approximately 2250° and does not display a mesh screen but rather is perforated.

Figure 4A:
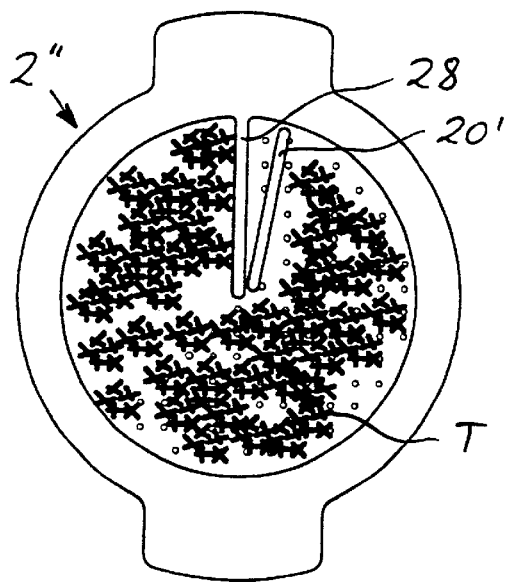
FIG. 4: the third implementation with the rotatable vane in its initial position (a) and its final position (b)
Figure 4B:
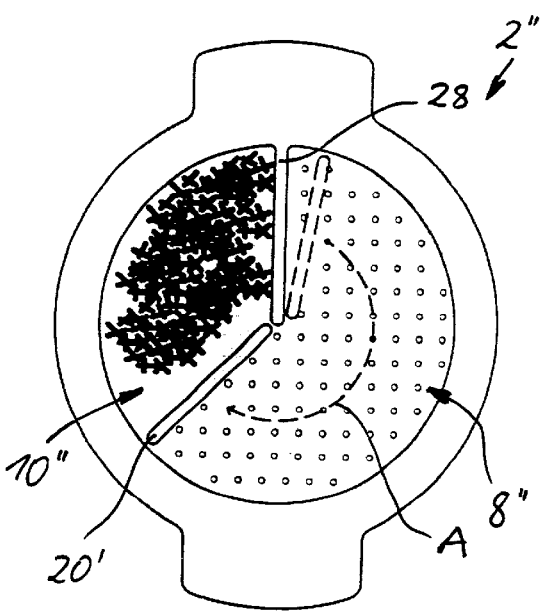

Represented in FIG. 4 is the manner of operation of the third implementation 2"; this representation, with respect to the manner of action of the rotatable vane, is to be considered as representative of all previously described implementations as well as those still to come. In FIG. 4a the rotatable vane 20' in its initial position is located near the stationary, partition element 28. Inside the tea filter housing the tea material T floats in the liquid, this material T being distributed essentially over the entire tea filter housing. If now the rotatable vane 20' is rotated in the direction of the arrow A represented in FIG. 4b, it reaches the final position shown in FIG. 4b, in which position it separates the liquid-impermeable second section 10" from the liquidpermeable first section 8". During the rotating movement from its initial position according to FIG. 4a into its final position according to FIG. 4b, the rotatable vane 20' takes the tea material T with, and encloses it in the liquid-impermeable second section 10", which forms a space that is bound, on the one hand, by the rotatable vane 20' and on the other hand by the partition element 28. Thus, the tea material T collected in the liquid-impermeable second section 10" is separated from the liquid-permeable first section 8" and is cut off from the surrounding liquid, so that flavoring material can no longer be released into the surrounding liquid.

In the above-described implementations, the rotational axis 22 can be designed, for example, as a metal rod that is fastened axially in the filter housing 4 and on which the rotatable vane 20 or 20' is supported in a pivoting manner.

However, for the second implementation 2' and the third implementation 2" it is conceivable as an alternative to make use, for example, of a cover for the rotatable support, as it is represented in FIG. 5 under the reference numeral 30. For this purpose, the rotatable vane 20' is attached to the underside 30a of this cover 30 so as to be rotationally fixed with respect to the cover 30, so that the vane projects into the filter housing 14 in a hanging manner when the cover 30 has been placed upon the filter element 2' or the corresponding container. In order that the cover 30 may take on the rotatable support of the rotatable vane 20', it must be ensured that the cover 30 itself can be arranged rotatably on the top side 4c of the filter housing 4 of the filter element 2' or on the top side of the container used. Preferably, the rotatable vane 20' can be formed as one piece with the cover 30 according to FIG. 3. Thus, through rotation of the placed-on cover 30, the rotatable vane 20' automatically undergoes a rotational movement in the previously described manner.

In addition, it is also conceivable to support the rotatable vane 20' so that it is not completely freely hanging or suspended, but rather to form on the underside of the rotatable vane 20' a small point that engages a corresponding depression in the bottom 4c of the filter housing 4. (This alternative is not represented in the figures).

Finally, instead of the cover shown in FIG. 3, it is also conceivable to make provision for a cover with an appropriate opening, through which the rotatable vane 20 or 20' sticks when then cover has been placed on, thus allowing the rotatable vane to be easily operated from the outside. Finally, the cover could also be provided with a central bore through which a rod is stuck, to whose exterior upper end a grip is attached and to whose opposite inner end the rotatable vane is attached, this rod serving at the same time as the rotational axis.

Figure 6:
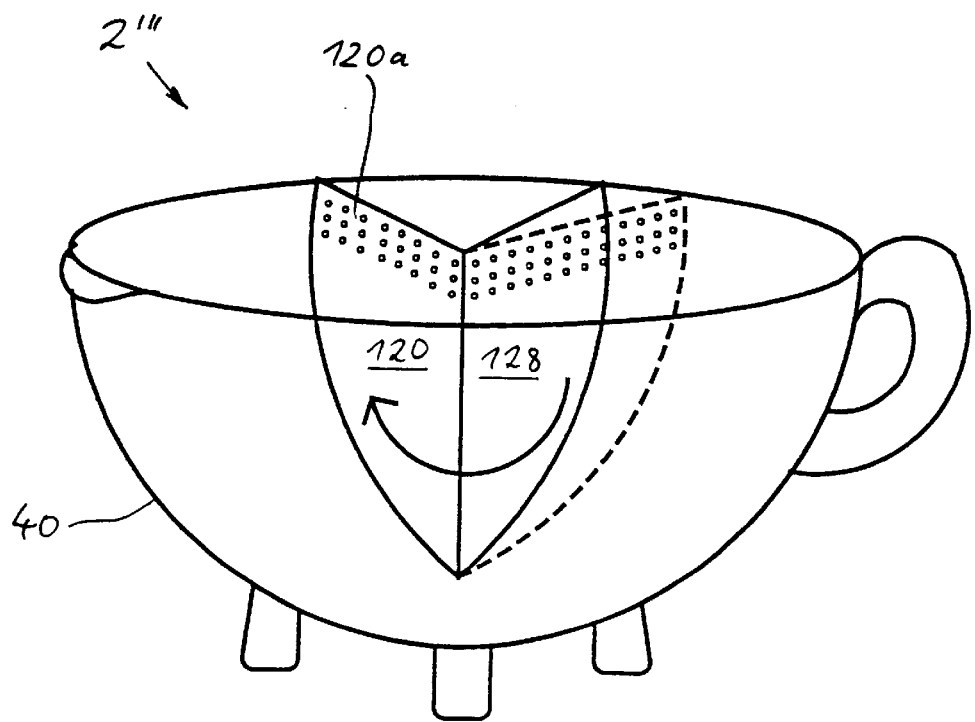
FIG. 6: in a see-through perspective representation and schematically, a fourth implementation of the device according to the invention, in a pot

Represented in FIG. 6 is a fourth implementation 2"', which is distinguished from the above-described implementations by the fact that the rotatable vane 120 and the stationary partition element 128 are not part of a filter element arranged in a container, e.g. a teapot, but rather are directly positioned in a container such as the pot 40 represented in FIG. 6. Here, the rotatable vane 120 is arranged with its vertical side edge facing the partition element 128 swingably supported on the adjacent vertical side edge of the stationary partition element 128. Further, the rotatable vane 120 displays on its upper part a perforated section 120a that is liquid-permeable and thus prevents the liquid from slopping over the rotatable vane 120 during the latter's swinging movement. The functioning of the rotatable vane 120 of the fourth implementation 2''' according to FIG. 6 is the same as is in the previously described implementations; in FIG. 6 the rotatable vane 120 is shown in its initial position with dashed lines and in its final position with solid lines.

Finally, provision can yet be made for a time-controlled drive arrangement, which is not represented in the drawings. The user sets on a timer the desired steeping time. After the steeping time has elapsed, the drive arrangement is automatically activated, thereby putting the rotatable vane 20 or 20' into rotating motion, in order to transport the filter sludge into the liquid-impermeable second section 10.

In conclusion, let it be noted that the device described above with the aid of different implementation examples can consist completely of plastic.

What is claimed is:

1. A device for encasing flavoring solids that are put into a liquid, comprising a housing having a vane that is supported within said housing, an opening forming a plane and a rotational axis being nonparallel to the plane of the opening, wherein the vane is rotatable about the rotational axis between an initial and final position and the vane in the final position bounds a space that holds the flavoring solids.

2. The device according to claim 1, wherein the housing further comprises a liquid-permeable section.

3. The device according to claim 2, wherein the liquid-permeable section is on an upper portion of the housing.

4. The device according to claim 2, wherein the liquid-permeable section is perforated.

5. The device according to claim 1 wherein the housing includes at least a liquid permeable section and a liquid impermeable section.

6. The device according to claim 5, further comprising a receptacle, wherein the housing and the vane are disposed in the receptacle.

7. The device according to claim 6, wherein the liquid-permeable section include a mesh screen.

8. The device according to claim 6, wherein the liquid-permeable section includes perforations.

9. The device according to claim 5, wherein the housing and the vane are formed of plastic.

10. The device according to claim 1, wherein the vane is disposed with at least a portion of edges of the vane substantially sealing and having a sliding fit against at least a portion of one of the housing.

11. The device according to claim 1, further comprising a stationary element extending from the wall of the housing to the rotational axis.

12. The device according to claim 1, wherein the vane is provided with a handle.

13. The device according to claim 1, further comprising a cover for closing the opening, wherein a handle is attached to the vane and is accessible through an opening in the cover.

14. The device according to claim 12, wherein the handle further comprises a stem passing through a hole in the cover to connect the handle to the vane.

15. The device according to claim 13, wherein the cover provides a rotational support for the vane allowing the vane to be rotated from the first position to the second position.

16. The device according to claim 1, wherein the vane is designed as an essentially plate-shaped element.

17. The device according to claim 1, further comprising a drive arrangement for driving the vane to confine flavoring solids into a space that is bounded by the first and second elements, wherein the drive arrangement is time-controllable.

* * * * *